US009275087B2

(12) United States Patent
Clemm et al.

(10) Patent No.: US 9,275,087 B2
(45) Date of Patent: *Mar. 1, 2016

(54) MANAGING VERSIONS OF ARTIFACTS STORED ACROSS DISPARATE TOOLS

(71) Applicant: International Business Machines Corporation, Armonk, NY (US)

(72) Inventors: Geoffrey M. Clemm, Concord, MA (US); Nicholas D. J. Crossley, Costa Mesa, CA (US); Daniel D. J. Leroux, Kanata (CA); Schuyler B. Matthews, Cary, NC (US); Martin P. Nally, Laguna Beach, CA (US); Darcy L. Wiborg Weber, Mission Viejo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/839,353

(22) Filed: Mar. 15, 2013

(65) Prior Publication Data

US 2014/0279975 A1    Sep. 18, 2014

(51) Int. Cl.
*G06F 17/30* (2006.01)
(52) U.S. Cl.
CPC .................. *G06F 17/30309* (2013.01)
(58) Field of Classification Search
USPC ................................................. 707/695, 702
See application file for complete search history.

(56) References Cited

U.S. PATENT DOCUMENTS

| 7,631,006 | B2 | 12/2009 | Hagstrom et al. | |
|---|---|---|---|---|
| 7,827,565 | B2 | 11/2010 | Minium, Jr. et al. | |
| 8,237,714 | B1 * | 8/2012 | Burke | 345/440 |
| 2002/0169781 | A1 * | 11/2002 | Poole et al. | 707/100 |
| 2004/0071363 | A1 * | 4/2004 | Kouri et al. | 382/276 |
| 2004/0143583 | A1 * | 7/2004 | Poole | G06F 9/4443 |
| 2006/0095276 | A1 * | 5/2006 | Axelrod | G06Q 99/00 717/104 |
| 2007/0100859 | A1 * | 5/2007 | Holmes et al. | 707/101 |
| 2007/0106982 | A1 | 5/2007 | Dalal et al. | |

(Continued)

OTHER PUBLICATIONS

Waltersdorfer, F. et al., "Version Management and Conflict Detection Across Heterogeneous Engineering Data Models," In Proc. of IEEE 8th Int'l Conf. on Industrial Informatics (INDIN), Jul. 13-16, 2010, pp. 928-935.

(Continued)

*Primary Examiner* — Hanh Thai
(74) *Attorney, Agent, or Firm* — Cuenot, Forsythe & Kim, LLC (57) ABSTRACT

Arrangements described herein relate to managing versions of artifacts stored across disparate tools. In a multi-dimensional configuration space, dimensions can be defined. The dimensions can represent respective variations of respective versions of a plurality of artifacts for at least a first configuration of a system. Via the dimensions, versions of the plurality of artifacts can be mapped to at least a corresponding first configuration of the system, the mapped versions of the plurality of artifacts corresponding to the versions of the artifacts used in the first configuration. The first configuration can be identified by a point in the multi-dimensional configuration space defined by the respective dimensions. At least a first of the plurality of artifacts can be stored by a first tool, and at least a second of the plurality of artifacts can be stored by a second tool disparate from the first tool.

14 Claims, 4 Drawing Sheets

(56) References Cited

U.S. PATENT DOCUMENTS

| | | | |
|---|---|---|---|
| 2007/0150490 A1* | 6/2007 | Kilian-Kehr | G06Q 10/109 |
| 2008/0181516 A1* | 7/2008 | Jackson | G06Q 10/10 382/236 |
| 2008/0301641 A1* | 12/2008 | Bojjireddy | G06F 9/44505 717/121 |
| 2010/0005122 A1* | 1/2010 | Jackson | 707/104.1 |
| 2010/0064277 A1 | 3/2010 | Baird et al. | |
| 2010/0293025 A1* | 11/2010 | Carbone et al. | 705/8 |
| 2011/0113359 A1 | 5/2011 | Massey et al. | |
| 2012/0272205 A1* | 10/2012 | Fox | G06F 8/36 717/101 |
| 2012/0311534 A1* | 12/2012 | Fox | G06F 8/71 717/120 |
| 2013/0074038 A1* | 3/2013 | Fox | G06F 8/70 717/122 |
| 2014/0157245 A1* | 6/2014 | Krueger | 717/140 |

OTHER PUBLICATIONS

Janakiram, D. et al., "A Metrics Suite for Version Management," [online] In Proc. of IEEE Int'l. Conf. on Information Technology Coding Computing (ITCC2005), Apr. 2005, retrieved from the Internet: <http://dos.iitm.ac.in/djwebsite/LabPapers/metricsSuite.pdf>, 7 pgs.

* cited by examiner

Define in a multi-dimensional configuration space, using a processor, dimensions representing respective variations of respective versions of a plurality of artifacts for at least a first configuration of a system
402

Map, via the dimensions, versions of the plurality of artifacts to at least a corresponding first configuration of the system, the mapped versions of the plurality of artifacts corresponding to the versions of the artifacts used in the first configuration, the first configuration identified by a point in the multi-dimensional configuration space defined by the respective dimensions
404

Identify a position of the first configuration in the multi-dimensional configuration space
406

Beginning at the position of the first configuration in the multi-dimensional configuration space, traverse backward through the multi-dimensional configuration space toward an origin of the multi-dimensional configuration space to identify at least one of the mappings representing a corresponding version of at least one of the artifacts used in the configuration
408

MANAGING VERSIONS OF ARTIFACTS STORED ACROSS DISPARATE TOOLS

BACKGROUND

Creating applications or systems from reusable components is common as a means to accelerate the delivery of solutions and reduce cost. Tracking the evolution of systems over time requires versioning, both for individual units of data and for configurations. The use of versioning provides the ability to view the history of individual units of data and compare any two versions of data to identify the changes between them, and the ability to view the history of a configuration to see how the data has changed over time. Today, the primary means of managing and tracking evolution of a system is via a configuration management system. A configuration management system requires a user to manually manage workspaces, and manually check out and check in data, assign new versions to the data, etc.

BRIEF SUMMARY

One or more embodiments disclosed within this specification relate to managing versions of artifacts stored across disparate tools.

A method of managing versions of artifacts stored across disparate tools can include defining in a multi-dimensional configuration space, by a processor, dimensions representing respective variations of respective versions of a plurality of artifacts for at least a first configuration of a system. The method also can include mapping, via the dimensions, versions of the plurality of artifacts to at least a corresponding first configuration of the system, the mapped versions of the plurality of artifacts corresponding to the versions of the artifacts used in the first configuration. The first configuration can be identified by a point in the multi-dimensional configuration space defined by the respective dimensions. At least a first of the plurality of artifacts can be stored by a first tool, and at least a second of the plurality of artifacts can be stored by a second tool disparate from the first tool.

Another embodiment can include a system having a processor. The processor can be configured to initiate executable operations including defining in a multi-dimensional configuration space dimensions representing respective variations of respective versions of a plurality of artifacts for at least a first configuration of a system. The executable operations also can include mapping, via the dimensions, versions of the plurality of artifacts to at least a corresponding first configuration of the system, the mapped versions of the plurality of artifacts corresponding to the versions of the artifacts used in the first configuration. The first configuration can be identified by a point in the multi-dimensional configuration space defined by the respective dimensions. At least a first of the plurality of artifacts can be stored by a first tool, and at least a second of the plurality of artifacts can be stored by a second tool disparate from the first tool.

Another embodiment can include a computer program product for managing versions of artifacts stored across disparate tools. The computer program product can include a computer-readable storage medium having stored thereon program code that, when executed, configures a processor to a method. The method can include defining in a multi-dimensional configuration space, by the processor, dimensions representing respective variations of respective versions of a plurality of artifacts for at least a first configuration of a system. The method also can include mapping, by the processor, via the dimensions, versions of the plurality of artifacts to at least a corresponding first configuration of the system, the mapped versions of the plurality of artifacts corresponding to the versions of the artifacts used in the first configuration. The first configuration can be identified by a point in the multi-dimensional configuration space defined by the respective dimensions. At least a first of the plurality of artifacts can be stored by a first tool, and at least a second of the plurality of artifacts can be stored by a second tool disparate from the first tool.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to defining, in a multi-dimensional configuration space, versions of a plurality of artifacts for a system, wherein each variation of each artifact is defined as a dimension in the multi-dimensional configuration space, wherein at least a first of the plurality of artifacts is stored by a first tool, and at least a second of the plurality of artifacts is stored by a second tool disparate from the first tool. The versions of the plurality of artifacts can be mapped to one or more corresponding configurations of the system, the mapped versions of the plurality of artifacts corresponding to the versions of the artifacts used in the configuration(s). Further, each configuration can be identified by a point in the multi-dimensional configuration space. Each point can be defined by the respective dimensions that define the respective versions of the artifacts used in the respective configuration. Accordingly, consistent versions of artifacts, which may be stored across disparate tools, can be managed, even if the tools are unaware of configuration management. In other words, the tools need not be configured to manage system configurations.

Several definitions that apply throughout this document will now be presented.

As used herein, the term "artifact" means a computer-based structure created for a practical purpose. An artifact can, for instance, comprise information (e.g., data) pertaining to a product (e.g., an article of manufacture, such as a system or a component of a system, a particular configuration of a system, an application, a service, a system, or the like). Examples of an artifact include, but are not limited to, a product identification, a product specification, a drawing (e.g., a computer-aided design (CAD) drawing), a bill of materials, a procedure, computer-program code (e.g., a modules, routine, sub-routine, or the like), and the like. Another example of an artifact is an artifact associated with one or more other artifacts, such as parent and/or child artifact.

In illustration, artifacts can be associated with one another in a hierarchy comprising a first parent artifact having one or more children artifacts, and one or more of the children artifacts themselves can be parent artifacts to other children artifacts. For example, a parent artifact can be a part identification, and the parent artifact can be associated with children artifacts corresponding to components of the part. An artifact which is a parent to other artifacts also can be a child artifact to its parent artifact. For example, an artifact can be an identifier for a component of the part, and thus be a child artifact to the artifact representing the part, but also have children artifacts, for example drawings, specifications, etc. for the component, and children artifacts for sub-components of the component, and so on.

As used herein, the term "concept resource" refers to all versions of an artifact. A version may be a represent a successive change to an artifact, or represent a variant of the artifact. For example, a second version of an artifact may replace a first version of the artifact for use in manufacturing. In a case that the second version is a variant of a first version, the first version may be used in a particular system or a particular configuration of the system, and the second version may be used in another configuration system or used in another system.

As used herein, the term "version" means a particular state of a concept resource. A version may be a represent a successive change to an artifact, or represent a variant of the artifact. For example, a second version of an artifact may replace a first version of the artifact for use in manufacturing. In a case that the second version is a variant of a first version, the first version may be used in a particular system or a particular configuration of the system, and the second version may be used in another configuration system or used in another system.

As used herein, a "configuration" is an artifact that defines a unique version of a system, for example as a point in a configuration space, by identifying a specific value for each related dimension in the configuration space. Dimension values and dimensions are ordered in the configuration space.

As used herein, the term "dimension" means a representation in a configuration space of a variation of an artifact. For example, a dimension may represent a change between a first version of an artifact and a second version of an artifact. A dimension may originate at a representation of the first version of an artifact in a configuration space and terminate at a second version of the artifact, or dimension may originate at an origin or axis of the configuration space and terminate at a particular version of an artifact or a system configuration, or a dimension may originate at an origin or axis of the configuration space and not terminate.

As used herein, the term "dimension value" is a value assigned to a dimension. A dimension value can comprise alphanumeric text and/or symbols, a numeric value, a time value, a Boolean value, or a reference to some artifact.

As used herein, the term "mapping" means creating an association between a point in a configuration space and an underlying artifact, for example a particular version of the artifact.

As used herein, the term "multi-dimensional configuration space" means a computer-based multi-dimensional environment in which relationships between one or more artifacts are represented in n-dimensions, wherein n is greater than one, greater than two, greater than three, greater than four, greater than five, and so on. In this regard, the dimensions define the "multi-dimensional configuration space."

As used herein, the term "tool" means an application or other software used to perform one or more functions or operations related to artifacts. For example, a tool can maintain versioning information for components represented by artifacts, a tool can maintain bills of materials for assemblies and/or configurations, a tool can maintain specifications and/or drawings for components represented by artifacts, a tool can maintain can maintain procedures related to components and/or configurations represented by artifacts, a tool can maintain procedures related to components and/or configurations represented by artifacts, and so on.

Figure 1:
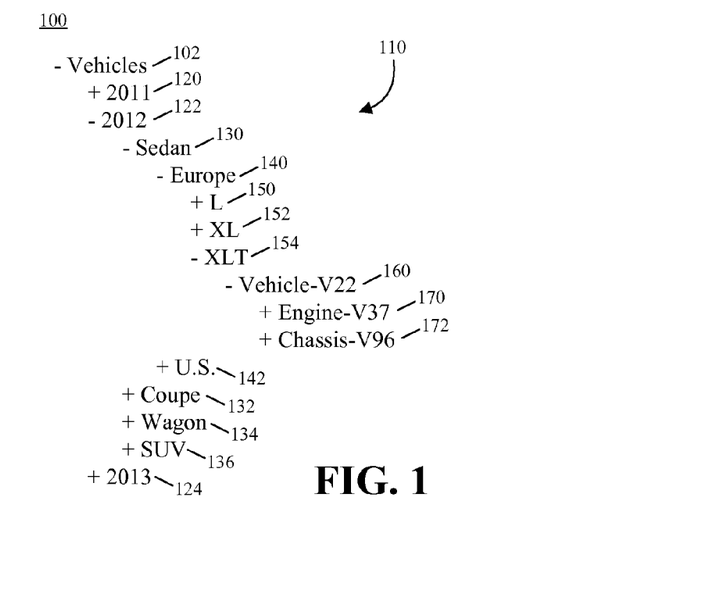
FIG. 1 depicts an example of a configuration space in accordance with an embodiment disclosed within this specification.

FIG. 1 depicts an example of a configuration space 100 in accordance with an embodiment disclosed within this specification. The configuration space 100 can include an artifact 102 having a value that represents the name of the configuration space 100, and dimensions 110 representing respective versions of various artifacts associated with the artifact 102.

In this example, the configuration space 100 pertains to vehicles, and can include a plurality of dimensions 120, 122, 124 having respective dimension values for different model years of vehicles, for example "2011," "2012" and "2013." The configuration space 100 also can include a plurality of dimensions 130, 132, 134, 136 having respective dimension values for different types of vehicles, for example "sedan," "coupe," and "wagon" and "SUV." The configuration space 100 also can include a plurality of dimensions 140, 142 having respective dimension values for different geographic regions, for example "Europe" and "U.S.", in which the vehicles are sold. In this regard, the vehicles may be configured differently for different geographic regions.

The configuration space 100 also can include a plurality of dimensions 150, 152, 154 having respective dimension values for different trim levels of the vehicles, for example "L,", "XL" and "XLT." The configuration space 100 also can include dimensions for versions of particular trim levels, such as a dimension 160 for a particular version of a trim level, such as a trim level represented by the dimension 154. The configuration space 100 also can include dimensions for versions of components used in particular versions of trim levels, such as a dimension 170 for an engine used in the version 160 and a dimension 172 for a chassis used in the version 160.

In the example presented, a user has drilled down to the components represented by the dimensions 170, 172 via a suitable user interface. The dimensions 122, 130, 140, 154, 160, 170, 172 represent a particular configuration of a system, namely a vehicle that is a European sedan with trim level XLT, version V22, using engine version V37 and chassis version V96. The user also can drill down to other configurations as well. In this regard, the dimensions 110 and dimension values are ordered in the configuration space 100. The user interface can be presented, for example, by a configuration application that manages configuration spaces with dimensions.

Figure 2:
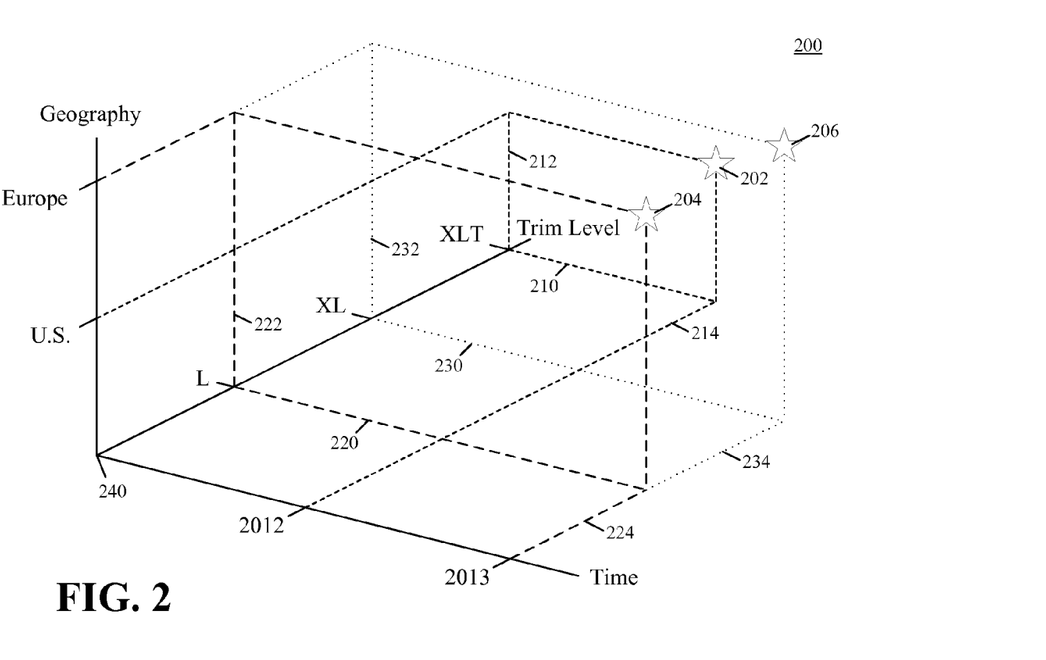
FIG. 2 depicts an example of a multi-dimensional configuration space in accordance with an embodiment disclosed within this specification.

FIG. 2 depicts an example of a multi-dimensional configuration space 200 (hereinafter "configuration space 200") in accordance with an embodiment disclosed within this specification. In the configuration space 200, a plurality of configurations 202, 204, 206 for a vehicle are presented. More particularly, a plurality of dimensions are defined for each configuration 202-206, thus mapping a plurality of artifacts used in the corresponding configurations 202-206 to the respective configurations 202-206.

In illustration, the configuration 202 of the vehicle can be identified by a point in the configuration space 200 defined by respective dimensions 210, 212, 214. The dimension 210 can represent an artifact indicating that configuration 202 is for a 2012 model, which is a variation of an artifact for a 2011 model. The dimension 212 can represent an artifact indicating that the configuration 202 is for a vehicle to be sold in the U.S., which is a variation of an artifact for a non-region specific model or European specified model. The dimension 212 can represent an artifact indicating that the configuration 202 is for a vehicle with XLT trim, which is a variation of an artifact for base model, L model or XL model. Similarly, the configuration 204 of the vehicle can be identified by a point in the configuration space 200 defined by respective dimensions 220, 222, 224, and the configuration 206 of the vehicle can be identified by a point in the configuration space 200 defined by respective dimensions 230, 232, 234. Positioning of the respective dimensions 220, 222, 224 in the configuration space can be performed by a version, variant and configuration (VVC) service.

When a position in the configuration space 200 for a particular configuration, for example the configuration 206, is established, other dimensions, and thus versions of artifacts, related to the particular configuration 206 can be identified based on the position. For example, the VVC service can begin in the configuration space 200 at the position where the configuration 206 is located, and traverse backward through the configuration space 200 toward an origin 240 of the configuration space 200 to identify dimensions (not shown), and thus artifact versions, of artifacts used in the configuration 206. If a dimension for a particular artifact used in the configuration 206 is not present, the VVC service can assume that the correct version of the artifact is a version used in a next lower trim level or a next earlier model year. For example, if an engine version for an XLT model is not defined, but the XLT model does include an engine, the VVC can assume that the XLT model uses the same engine version used in the XL model.

In some cases a particular artifact may be included in one configuration and not another. For example, the configuration 204 may include a base stereo system, whereas the configuration 206 may include an enhanced stereo system, which is not a version of the base stereo system, but an entirely different stereo system. If, however, a version for an artifact representing the base stereo system is inadvertently associated with the configuration 206, that version can be un-mapped from the configuration 206. For example, in one arrangement, a user input can be received to remove the dimension. In another arrangement, the VVC service can identify a conflict between the base stereo system and the enhanced stereo system, and remove the dimension. In this regard, the VVC service can prompt a user to select which dimension that is to be removed, or make the determination based on other information available to the VVC service.

Oftentimes new versions of artifacts are created to replace previous versions used in a particular configuration 202-206. When, or after, this occurs, for a particular artifact, the new version of the artifact can be identified. Responsive to identifying the new version of the artifact, the new version of the artifact can be mapped in the configuration space 200 via a respective dimension. The respective dimension can be set to a time corresponding to when the new version is created. For example, if a new version of the artifact is created for use during model year 2013, the dimension for that version can be set to model year 2013.

The artifacts represented by the dimensions 210-214, 220-224, 230-234, or any other dimensions that are identified, need not all be stored by the same tool. For example, certain dimensions may be stored by product management tools that hold bills of materials, certain dimensions may be stored by requirement management tools that specify requirements for systems and/or components, certain dimensions may be stored by modeling tools (e.g., computer-aided design) tools, and certain dimensions may be stored elsewhere. Nonetheless, the mapping described with respect to FIG. 2 can be performed by the VVC service. The VVC service can interface with any suitable tools to identify mappings between various artifacts, identify the specific versions of the artifacts that correspond to the configurations 202-206, and identify their dimensions. For example, the VVC service can interface with any number of tools to identify dimensions used to establish the positions of the configurations 202-206 in the configuration space 200, and to identify dimensions for versions of artifacts used in such configurations 202-206 and map such dimensions to the configuration space 200.

Figure 3:
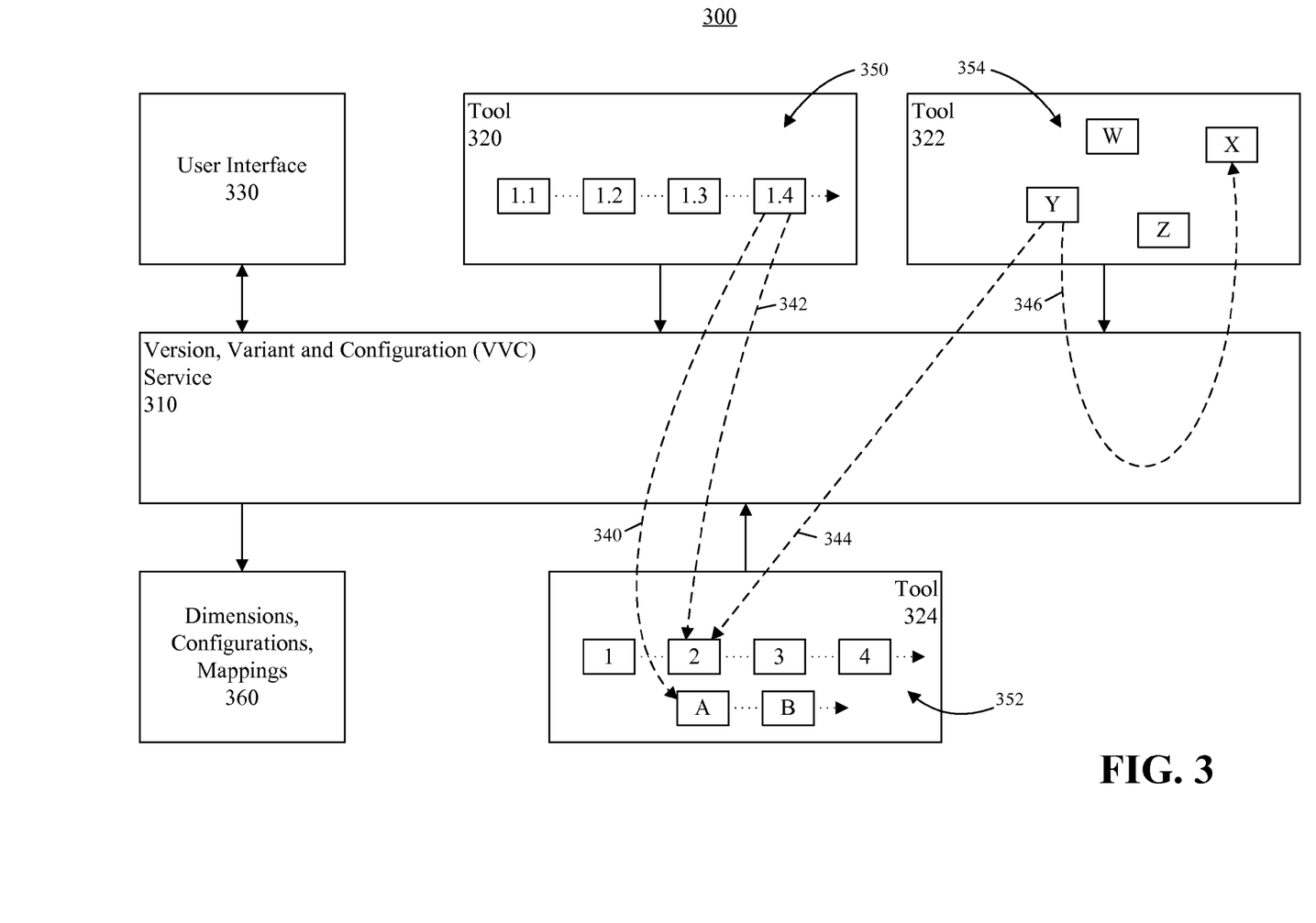
FIG. 3 depicts an example of a system for managing artifacts stored across disparate tools in accordance with an embodiment disclosed within this specification.

FIG. 3 depicts an example of a system 300 for managing artifacts stored across disparate tools, in accordance with an embodiment disclosed within this specification. The system 300 can include the Version, Variant and Configuration (VVC) service 310. The VVC service 310 can perform the methods/processes previously described, as well as additional method/processes, such as further methods/processes which will be described herein.

The system 300 also can include a plurality of tools 320, 322, 324. The tools 320-324 not only may be disparate from one another, but also may be disparate from the VVC service 310. By way of example, the tool 320 can store information/data related to various versions of a particular artifact (e.g., a component of a system). The tool 322 can store information/data related to various components. The tool 324 can specify procedures related to various components. These are mere examples and the present arrangements are not limited in this regard. Although in this example the tool 320 is aware of versions for a particular component, this need not be the case. Moreover, the tools 322, 324 need not be aware of particular versions. Additional tools (not shown) also may be included in the system 300. It is not required that each tool provide artifacts to any particular configuration.

The system 300 also can include a user interface 330 for the VVC service 310. The user interface 330 can be presented to a user via a suitable processing system. Via the user interface 330, the user can administer identify configurations to be included in a multi-dimensional configuration space, and for which dimensions are to be mapped. Via the user interface 330, the user also can create and administer configurations, their dimensions and dimension values in the multi-dimensional configuration space. As used herein, the term "user" means a person, for example an administrator, a developer, etc.

In operation, the VVC service 310 can identify links 340, 342, 344, 346 between various artifacts 350, 352, 354. The links 340-346 can be, for example, can be defined by respective concept resource identifiers, such as uniform resource identifiers (URIs). In one arrangement, the concept resource identifiers need not indicate a particular version of an artifact, and instead only identify the concept resource. The links 340-346 can be created at the behest of users working the components represented by the artifacts 350-354. For example, when working on an engine, a user can provide context for that component, or a particular version of that component, for example indicating that it is to be used in a particular vehicle model or vehicle models. The component can be represented by a concept resource. As noted, the concept resource may include multiple versions of the component, but such versions can be clearly articulated, for example by the tool 320 or another suitable tool.

The VVC service 310 can process the concept resource identifiers to identify the concept resources, and then use the mappings created by the tools 320-324 to identify the appropriate versions (e.g., the latest versions implemented for production) of the concept resources. In this manner, the VVC service 310 can identify the correct versions of artifacts that have been mapped to the multi-dimensional configuration space, and return those identities to the tools 320-324.

The VVC service 310 can be communicatively linked to the tools 320-324 and the user interface 330 in any suitable manner. For example, each of the VVC service 310, the tools 320-324 and the user interface 330 can be executed on the same processing system. In another arrangement, one or more of the tools 320-324 and the user interface 330 can be executed on a processing system to which the processing system executing the VVC service 310 is communicatively linked via one or more communication networks. The communication networks can be implemented as, or include, any of a variety of different networks such as a WAN, a LAN, a wireless network, a mobile network, a Virtual Private Network (VPN), the Internet, the Public Switched Telephone Network (PSTN), or the like.

The VVC service 310 can output, for example at the behest of the user, the dimensions, configurations and/or mappings 360 described herein. As used herein, the term output means presenting on a display, storing to a machine-readable data storage, printing, transmitting to another system to be processed, presented, stored or printed, or the like. The dimensions, configurations and/or mappings 360 can be output as a flat file representing the multi-dimensional configuration space, as a pictorial representation of the multi-dimensional configuration space, or in any other suitable manner.

Figure 4:
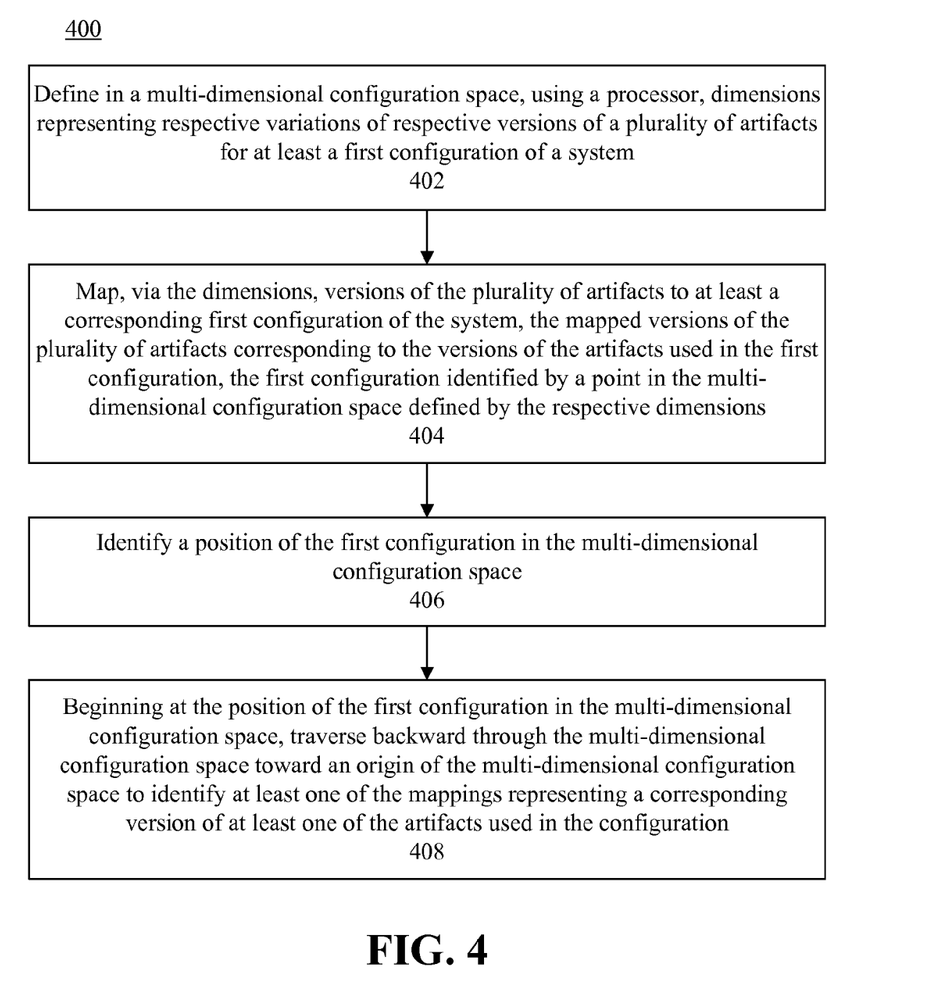
FIG. 4 depicts a method for managing artifacts stored across disparate tools, in accordance with an embodiment disclosed within this specification.

FIG. 4 depicts a method 400 for managing artifacts stored across disparate tools, in accordance with an embodiment disclosed within this specification. At step 402, in a multi-dimensional configuration space, dimensions representing respective variations of respective versions of a plurality of artifacts for at least a first configuration of a system can be defined by a processor. At step 406, a position of the first configuration in the multi-dimensional configuration space can be identified. At step 408, beginning at the position of the first configuration in the multi-dimensional configuration space, traverse backward through the multi-dimensional configuration space toward an origin of the multi-dimensional configuration space to identify at least one of the mappings representing a corresponding version of at least one of the artifacts used in the configuration.

Figure 5:
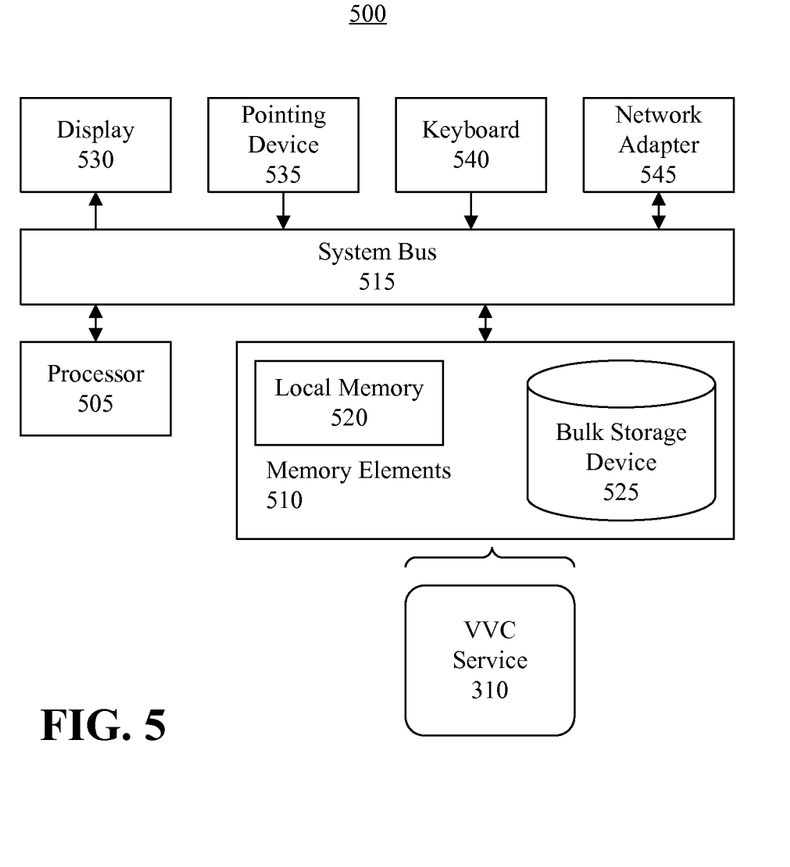
FIG. 5 depicts an example of a processing system for managing artifacts stored across disparate tools, in accordance with an embodiment disclosed within this specification.

FIG. 5 depicts an example of a processing system 500 for managing artifacts stored across disparate tools, in accordance with an embodiment disclosed within this specification.

The processing system 500 can include at least one processor 505 (e.g., a central processing unit) coupled to memory elements 510 through a system bus 515 or other suitable circuitry. As such, the processing system 500 can store program code within the memory elements 510. The processor 505 can execute the program code accessed from the memory elements 510 via the system bus 515. It should be appreciated that the processing system 500 can be implemented in the form of any system including a processor and memory that is capable of performing the functions and/or operations described within this specification. For example, the processing system 500 can be implemented as a server, a workstation, a desktop computer, and so on.

The memory elements 510 can include one or more physical memory devices such as, for example, local memory 520 and one or more bulk storage devices 525. Local memory 520 refers to RAM or other non-persistent memory device(s) generally used during actual execution of the program code. The bulk storage device(s) 525 can be implemented as a hard disk drive (HDD), solid state drive (SSD), or other persistent data storage device. The processing system 500 also can include one or more cache memories (not shown) that provide temporary storage of at least some program code in order to reduce the number of times program code must be retrieved from the bulk storage device 525 during execution.

Input/output (I/O) devices such as a display 530, a pointing device 535 and a keyboard 540 optionally can be coupled to the processing system 500. The I/O devices can be coupled to the processing system 500 either directly or through intervening I/O controllers. For example, the display 530 can be coupled to the processing system 500 via a graphics processing unit (GPU), which may be a component of the processor 505 or a discrete device. One or more network adapters 545 also can be coupled to processing system 500 to enable processing system 500 to become coupled to other systems, computer systems, remote printers, and/or remote storage devices through intervening private or public networks. Modems, cable modems, transceivers, and Ethernet cards are examples of different types of network adapters 545 that can be used with processing system 500.

As pictured in FIG. 5, the memory elements 510 can store the components of the system 300 of FIG. 3, namely the VVC service 310. Being implemented in the form of executable program code, the VVC service 310 can be executed by the processing system 500 and, as such, can be considered part of the processing system 500. Optionally, the memory elements 510 also can store the tools 320-324 and user interface 330. The VVC service 310, tools 320-324 and user interface 330 are functional data structures that impart functionality when employed as part of, or communicatively linked to, the processing system 500 of FIG. 5. Moreover, the artifacts 350, 352, 354 and links 340-346 of FIG. 3 are functional data structures that impart functionality when processed by the processing system 500 of FIG. 5.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
a processor programmed to initiate executable operations comprising:
defining in a multi-dimensional configuration space dimensions representing respective variations of respective versions of a plurality of artifacts for at least a first configuration of a system; and
mapping, via the dimensions, versions of the plurality of artifacts to at least a corresponding first configuration of the system, the mapped versions of the plurality of artifacts corresponding to the versions of the artifacts used in the first configuration, the first configuration identified by a point in the multi-dimensional configuration space defined by the respective dimensions;
wherein at least a first of the plurality of artifacts is stored by a first tool, and at least a second of the plurality of artifacts is stored by a second tool disparate from the first tool.

2. The system of claim 1, the executable operations further comprising:
identifying a position of the first configuration in the multi-dimensional configuration space;
beginning at the position of the first configuration in the multi-dimensional configuration space, traversing backward through the multi-dimensional configuration space toward an origin of the multi-dimensional configuration space to identify at least one of the mappings representing a corresponding version of at least one of the artifacts used in the configuration.

3. The system of claim 1, the executable operations further comprising:
receiving, via a configuration service disparate from the first and second tools, at least one user input to administer the first configuration or the dimensions in the multi-dimensional configuration space.

4. The system of claim 3, wherein mapping the versions of the plurality of artifacts of the system to the first configuration of the system comprises:
performing the mapping via the configuration service disparate from the first and second tools.

5. The system of claim 1, the executable operations further comprising:
identifying a link between at least a first artifact stored by the first tool and at least a second artifact stored by the second tool;
identifying a correct version of the second artifact for the first configuration of the system; and
mapping the correct version of the second artifact, via a respective dimension, to the first artifact in the multi-dimensional configuration space.

6. The system of claim 1, the executable operations further comprising:
identifying a new version of at least one of the plurality of artifacts of the system; and
responsive to identifying the new version of at least one of the plurality of artifacts of the system, mapping the new version in the multi-dimensional configuration space via a respective dimension, wherein the respective dimension is set to a time corresponding to when the new version is created.

7. The system of claim 1, the executable operations further comprising:
identifying a second configuration for the system;
identifying at least one of the plurality of artifacts corresponding to the first configuration of the system that is not used in the second configuration of the system; and
un-mapping a version of at least one of the plurality of artifacts from the second configuration of the system.

8. A computer program product for managing versions of artifacts stored across disparate tools, the computer program product comprising a computer readable storage medium having program code stored thereon, the program code executable by a processor to perform a method comprising:
defining in a multi-dimensional configuration space, by the processor, dimensions representing respective variations of respective versions of a plurality of artifacts for at least a first configuration of a system; and
mapping, by the processor, via the dimensions, versions of the plurality of artifacts to at least a corresponding first configuration of the system, the mapped versions of the plurality of artifacts corresponding to the versions of the artifacts used in the first configuration, the first configuration identified by a point in the multi-dimensional configuration space defined by the respective dimensions;
wherein at least a first of the plurality of artifacts is stored by a first tool, and at least a second of the plurality of artifacts is stored by a second tool disparate from the first tool.

9. The computer program product of claim 8, the method further comprising:
identifying, by the processor, a position of the first configuration in the multi-dimensional configuration space;
beginning at the position of the first configuration in the multi-dimensional configuration space, by the processor, traversing backward through the multi-dimensional configuration space toward an origin of the multi-dimensional configuration space to identify at least one of the mappings representing a corresponding version of at least one of the artifacts used in the configuration.

10. The computer program product of claim 8, the method further comprising:
receiving, by the processor, via a configuration service disparate from the first and second tools, at least one user input to administer the first configuration or the dimensions in the multi-dimensional configuration space.

11. The computer program product of claim 10, wherein mapping the versions of the plurality of artifacts of the system to the first configuration of the system comprises:
performing the mapping via the configuration service disparate from the first and second tools.

12. The computer program product of claim 8, the method further comprising:
- identifying, by the processor, a link between at least a first artifact stored by the first tool and at least a second artifact stored by the second tool;
- identifying, by the processor, a correct version of the second artifact for the first configuration of the system; and
- mapping, by the processor, the correct version of the second artifact, via a respective dimension, to the first artifact in the multi-dimensional configuration space.

13. The computer program product of claim 8, the method further comprising:
- identifying, by the processor, a new version of at least one of the plurality of artifacts of the system; and
- responsive to identifying the new version of at least one of the plurality of artifacts of the system, by the processor, mapping the new version in the multi-dimensional configuration space via a respective dimension, wherein the respective dimension is set to a time corresponding to when the new version is created.

14. The computer program product of claim 8, the method further comprising:
- identifying a second configuration for the system;
- identifying at least one of the plurality of artifacts corresponding to the first configuration of the system that is not used in the second configuration of the system; and
- un-mapping a version of at least one of the plurality of artifacts from the second configuration of the system.

\* \* \* \* \*